US006861002B2

(12) United States Patent
Hughes

(10) Patent No.: US 6,861,002 B2
(45) Date of Patent: Mar. 1, 2005

(54) REACTIVE COMPOSITIONS FOR FLUID TREATMENT

(75) Inventor: Kenneth D. Hughes, Alpharetta, GA (US)

(73) Assignee: WaterVisions International, Inc., Cumming, GA (US)

( * ) Notice: Subject to any disclaimer, the term of this patent is extended or adjusted under 35 U.S.C. 154(b) by 176 days.

(21) Appl. No.: 10/125,075

(22) Filed: Apr. 17, 2002

(65) Prior Publication Data
US 2003/0196966 A1 Oct. 23, 2003

(51) Int. Cl.$^7$ .................................................. C02F 1/28
(52) U.S. Cl. ..................... 210/681; 210/683; 210/687; 210/688; 210/263; 210/510.1
(58) Field of Search .................. 210/681, 683, 210/687, 688, 263, 510.1

(56) References Cited

U.S. PATENT DOCUMENTS

| | | | |
|---|---|---|---|
| 5,189,092 A | 2/1993 | Koslow | |
| 5,249,948 A | 10/1993 | Koslow | |
| 5,331,037 A | 7/1994 | Koslow | |
| 5,688,378 A | 11/1997 | Khoe et al. | |
| 5,770,416 A | * 6/1998 | Lihme et al. | ................ 435/176 |
| 6,117,333 A | 9/2000 | Frankiewicz et al. | |
| 6,355,093 B1 | 3/2002 | Schwartz et al. | |
| 6,368,510 B2 | 4/2002 | Friot | |
| 6,468,942 B1 | * 10/2002 | Sansalone | ................... 502/402 |

* cited by examiner

Primary Examiner—Robert A. Hopkins
(74) Attorney, Agent, or Firm—Kilpatrick Stockton LLP; Dean W. Russell; Robert E. Richards

(57) ABSTRACT

A method and device for the chemical conversion, filtration and/or purification of fluids water or other solutions containing microbiological and chemical contaminants, such as fluids containing arsenic, chlorine, bacteria, viruses, and cysts, where the fluid is passed through a purification material composed of fluid treatment carbon, metal phosphates, metal oxides, reduced metals, metal silicates, metal sulfates, metal carbonates, metal hydroxides, or combinations thereof. The material may be included in a fixed binder matrix.

131 Claims, 1 Drawing Sheet

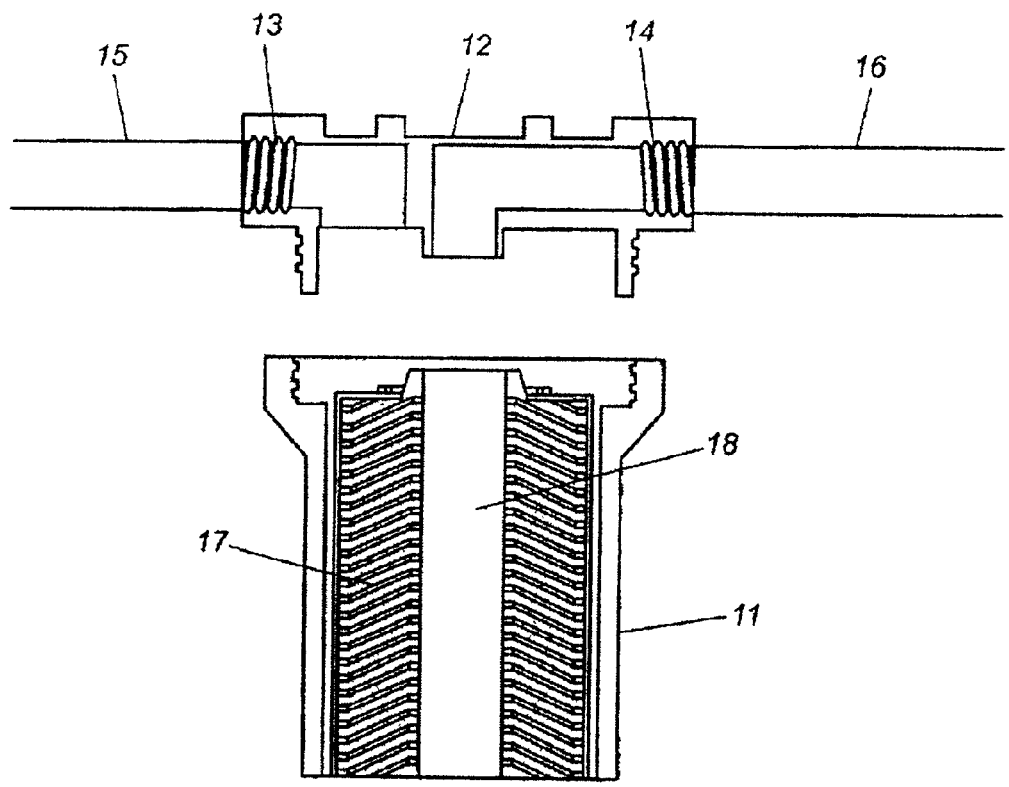
Fig. 1
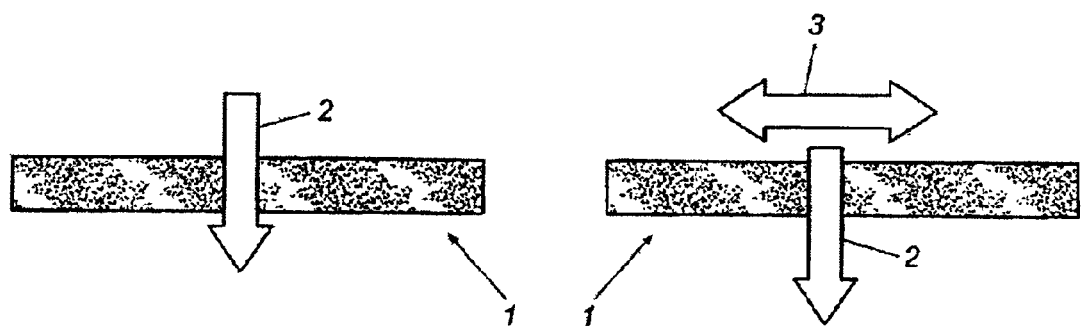
Fig. 2a  Fig. 2b

REACTIVE COMPOSITIONS FOR FLUID TREATMENT

FIELD OF THE INVENTION

This invention relates generally to the field of solution and fluid treatment devices, primarily to aqueous solution and water treatment, devices for gases and industrial fluids and other aqueous liquids, which modify the components of the gas or aqueous liquid solution passed through them. In its more particular aspects, the invention relates to the field of such devices that react with chemical and microbiological contaminants, including toxic metals and hydrocarbons, bacteria and viruses and their components, contained in water or aqueous solutions.

DESCRIPTION OF RELATED ART

Purification or filtration of water or other aqueous solutions is necessary for many applications, from the provision of safe or potable drinking water to biotechnology applications including fermentation processing and separation of components from biological fluids, and to industrial processes that require waste stream treatment and recovery of process chemicals. Similarly, the removal of contaminants from fluids used in medical procedures and semiconductor fabrication processes, where ultrapurified fluids are required, and in environments where the fluids will be recirculated, such as aircraft or spacecraft, is also an important application for filtration and fluid treatment materials. In recent years, the need for water filtration and purification in the home has become more recognized, and the competing concerns of energy efficiency and residential fluid quality have lead to numerous filtration products, that purport to remove small particles, allergens, microorganisms, intentionally introduced biotoxins, pesticides, and toxic metals such as lead, mercury, and arsenic.

There are many well-known methods currently used for water purification, such as reverse osmosis, distillation, ion-exchange, chemical adsorption, coagulation, and filtering or retention. Particle filtration may be completed through the use of membranes or layers of granular materials. Other fluid purification techniques involve chemical introduction which alters the state or chemical identity of the contaminant. Examples of chemical additives include oxidizing agents, flocculating agents, and precipitation agents.

In many fluid purification applications a combination of techniques are required in order to completely purify fluids, such as water. Combinations of technologies may be implemented by combining functions in a single device or using several different devices and technologies in series where each performs a distinct function. Examples of this practice include the use of mixed ion-exchange resins that remove both negative and positively charged chemical species and oxidation/filtration methods where oxidizers are used to generate particulate matter that may be subsequently filtered.

Many of these fluid purification technologies, techniques, and practices are costly, energy inefficient and/or require significant technical know-how and sophistication to implement on both large and small scales. As a result, many advanced fluid purification technologies have had limited application in residential point of entry (POE) and point of use (POU) applications.

Unfortunately, currently available low cost, simple techniques and inexpensive devices fabricated for residential POU/POE markets do not adequately meet the contaminant removal levels required by regulatory agencies. For example, simple sink POU water purification devices containing activated carbon or activated alumina or portable units for campers and hikers can not remove microorganisms or chemical toxins such as arsenic in both trivalent and pentavalent forms to regulatory levels.

Although some debate exists The Environmental Protection Agency (EPA) and the World Health Organization (WHO) have set forth minimum standards for acceptance of devices proposed for use as a water purifier capable of removing toxic metals including lead and soluble forms of arsenic. Currently, in the case of arsenic treatment, the technology purporting arsenic removal must reduce the combined concentration of all arsenic species to below 10 ppb (10 micrograms/liter). It is expected that in the future this level will be further decreased.

Technologies and devices that are inexpensive for continual use on an annual basis, simple to operate, contain low concentrations of safe chemicals, and are highly efficient at removing both microbiological and chemical impurities have numerous applications if they can be developed. In particular, technologies and devices with these characteristics have application in potable water treatment, cooling water treatment, and in the fields of semiconductor fabrication and manipulation, mining, biotechnology, healthcare, and the beverage industries. Such technologies and devices would also be useful in the processing of fluids in many industries where fluids require recycling or reuse. Furthermore these technologies and devices would be invaluable reclamation tools for recovering chemical constituents from known environmental waste sites such as abandon mines and super-fund locations.

In the specific treatment of the toxic metal arsenic there is much known fluid technology and art. Arsenic is found in both particulate and soluble forms. With respect to the soluble form oxy-compounds based on a metal oxidation state of three (trivalent) and five (pentavalent) are common. Common trivalent arsenic compounds are neutral (uncharged) at common drinking water pHs while pentavalent arsenic compounds are negatively charged at common drinking water pHs. These facts facilitate the removal of pentavalent arsenic by many standard technologies but make trivalent arsenic extremely difficult to address with all known fluid purification strategies. It is generally understood that to meet the regulatory requirements for arsenic in drinking water all trivalent arsenic must be converted to pentavalent arsenic in a preliminary treatment step. Lengthy discussion of the arsenic toxicity problems around the world and current art and/or best available technologies (BAT) are detailed in the many documents available from the United States Environmental Protection Agencies (US-EPA) and from the World Health Organization (WHO).

This existing art includes fluid stream treatment with oxidizing compounds, co-precipitation elements, and methods for the physical segregation of the compounds or particulate material containing the metals using properties of size, charge, and density. Technology and methods which dose chemical oxidizers into fluid streams for converting trivalent arsenic to pentavalent arsenic commonly use halogens, chlorine derivatives, peroxides, permanganates, persulfates, and percarbonates. After conversion to the pentavalent arsenic species methods including coagulation and filtration, adsorption, precipitation, and membrane processes such as reverse osmosis, nanofiltration, and ultrafiltration are used to remove this species. It should be noted that conversion of the trivalent arsenic to the pentavalent arsenic decreases the toxicity of the metal toxin by approximately 50 fold.

Other technologies that have been described use ultraviolet radiation, silicates treated with permanganate, metal hydroxides and reduced metals for arsenic treatment. Prior art described in U.S. Pat. Nos. 6,117,333 and 5,688,378 serve as good examples of current methods and techniques.

Both the chemicals and the equipment used to treat fluid streams by dosing or through batch processing are expensive. Operation of dosing equipment and the storage of oxidizing chemicals for dosing requires significant experience, technical sophistication and knowledge of chemical safety regulations and techniques. As a result many arsenic treatment technologies, devices, and known art that provide rapid oxidation of trivalent arsenic to pentavalent arsenic are not suited for residential POE/POU. Increasingly, these methods are also inconvenient and inappropriate for many small businesses and at many large industrial locations. In many situations the cost of this pretreatment step determines the cost effectiveness of the full arsenic treatment program.

There are no known commercially available or other fluid purification devices incorporating composites composed of fluid treatment carbon, metal phosphates, metal oxides, reduced metals, silicates, metal sulfates, metal carbonates, silicates, metal hydroxides, or mixtures thereof in loose particulate or fiber form or containing material binders which result in porous block devices that can rapidly convert trivalent arsenic to pentavalent arsenic.

Furthermore there are no known composites composed of fluid treatment carbon, metal phosphates, metal oxides, reduced metals, silicates, metal sulfates, metal carbonates, silicates, metal hydroxides, or combinations thereof such as those described that can perform both chemical oxidation and chemical reduction processes on different toxic components found in fluids. As example the composites described vide supra efficiently oxidize trivalent arsenic to pentavalent arsenic and rapidly reduce chlorine and chloramines in aqueous fluids.

Furthermore there are no known composites such as those described that can perform these chemical reactions without a continual surface pretreatment step or continuous addition of oxidizing compounds to the fluid stream.

Furthermore, there are no known composites that can provide one or more of the following functions in a simple inexpensive device, 1) chemical oxidation reactions, 2) chemical reduction reactions, and/or 3) microbial contaminant reduction.

Accordingly, there remains a need in this art for an uncomplicated, safe, and inexpensive fluid purification and filtration method and devices that can provide the ability to oxidize and reduce inorganic and organic species as well as decrease the concentration of microbiological species.

More specifically there is an urgent need for technology that can inexpensively meet the requirements of national and global regulatory agencies.

Additionally, a simple means for incorporating fluid treatment carbon, metal phosphates, metal oxides, reduced metals, silicates, metal sulfates, metal carbonates, silicates, metal hydroxides, or combinations thereof obtained from natural and synthetic materials into inexpensive fluid treatment devices is highly desired.

It is the intention of this invention and art to use composite preparations incorporating complex mixtures of fluid treatment carbon, metal phosphates, metal oxides, reduced metals, silicates, metal sulfates, metal carbonates, silicates, metal hydroxides, or combinations thereof to generate a practical fluid purification technology, filtration devices, and techniques. It is a further intention of this invention to permit fabrication of these composites by use of materials in forms which are readily available and commonly found naturally or synthesized by a variety of different methods.

There is also a need in the art for a method and devices that simultaneously meet the minimum regulatory safety requirements for fluid treatment devices as well as the arsenic reduction requirements, such that the device is more than suitable for consumer and industry point-of-use applications.

SUMMARY OF THE INVENTION

To this end, the present inventors have discovered that a significant problem in the treatment of fluids for the removal of toxic metals and other nuisance species present in fluid streams is that both oxidation and reduction reactions are required to convert these species to forms that are less toxic and which can easily be adsorbed, filtered, or removed by additional technologies. Furthermore, technology that can simultaneously reduce both chemical and microbiological contaminants to regulatory levels established by agencies such as the US EPA and the WHO is desired.

With respect to the toxin arsenic, the standard method of introducing oxidizing chemicals into a fluid stream to convert highly toxic trivalent arsenic to less toxic pentavalent arsenic and ultimately to remove the pentavalent arsenic requires expensive dosing equipment, significant technical sophistication, and understanding of hazardous chemical storage principles. These techniques, significantly increase the cost of treatment, are not easily adapted to residential settings and are increasingly inconvenient for many industrial, military, and government institutions.

Further, the present inventors have discovered that composite materials containing inexpensive solids originating from natural sources or synthetic sources or a combination thereof which are capable of performing both oxidative and reductive chemical reactions in water treatment applications have not been developed that meet the unique arsenic reduction needs of consumers in residential settings and increasingly the requirements of many industrial, military, and government institutions.

Additionally, it has been recognized that improvements in the efficiency of the composites may be obtained by using a material binder. Fluid treatment devices generated with materials in loose form are compromised by channeling and by-pass effects caused by the pressure of fluid, in particular, water and aqueous solutions, flowing through the filter media as well as particle erosion and aggregation. Because contaminants such as toxic compounds, heavy metals, and microorganisms and their components are converted and/or removed by intimate contact with the composite material, even relatively small channels or pathways in granular compositions formed over time by water pressure, water flow, particle erosion, or particle aggregation are easily sufficient to allow passage of untreated contaminants through the device.

One method of this invention solves these problems by providing a composite material, devices, and methods for contaminant removal by preparing mixtures of fluid treatment carbon, metal phosphates, metal oxides, reduced metals, silicates, metal sulfates, metal carbonates, silicates, metal hydroxides, or combinations thereof with a binder material to form a porous filter material that eliminates the possibility of channeling and contaminant agent by-pass.

This invention is in general a device and method for the purification and filtration of fluids, in particular aqueous fluids (such as drinking water or swimming or bathing water), or other aqueous solutions (such as fermentation broths, solutions used in cell culture, and in biotechnology applications), or gases and mixtures of gases such as breathable air, found in clean rooms, hospitals, diving equipment homes, aircraft, or spacecraft, and gases used to sparge, purge, or remove particulate matter from surfaces. It may be used as a pretreatment device for membrane, coagulation, flocculation, precipitation, and ion exchange processes which are commonly used in many industries including those which generate potable water, process semiconductor material, process industrial fluids, and which address environmental contamination.

The use of the device and method of the invention results in the conversion of an extremely high percentage of contaminants, including trivalent arsenic species and water treatment chlorine compounds to more benign species. In particular, the use of the device and method of the invention results in purification of water to a level that meets EPA, WHO, and NSF standards for designation as a water treatment device.

In one embodiment, the invention relates to a fluid treatment material that contains fluid treatment carbon, metal phosphates, metal oxides, reduced metals, silicates, metal sulfates, metal carbonates, silicates, metal hydroxides, or combinations thereof. These compounds may be in particulate or fiber forms or mixtures thereof. Typically, at least a portion of these minerals are in the from of calcium phosphate including monocalcium, dicalcium, and tricalcium forms, iron oxides and phosphates and hydroxides, iron metal, calcium carbonate, calcium sulfates, and various metal silicates, and has been obtained from natural sources, e.g., mining, natural material processing, or from synthetic sources such as the mixing of chemicals containing the individual elements including calcium, phosphate, iron, and carbonate, sulfate, and silicate. The carbon is typically activated with known processes. The various composites generated from these minerals and elements are contained in a porous vessel and allows fluid to pass therethrough.

In another embodiment, the invention relates to a fluid treatment material that contains fluid treatment carbon, metal phosphates, metal oxides, reduced metals, silicates, metal sulfates, metal carbonates, silicates, metal hydroxides, or combinations thereof is in the form of a porous block as the result of the presence of a binder. Typically, at least a portion of these minerals are in the from of calcium phosphate including at least one of monocalcium, dicalcium, and tricalcium forms, iron oxides, phosphates, and hydroxides, iron metal, calcium carbonate, calcium sulfates, and various metal silicates, and has been obtained from natural sources, e.g., mining, natural material processing, or from synthetic sources such as the mixing of chemicals containing the individual elements including calcium, phosphate, iron, and carbonate, sulfate, and silicate. The carbon is typically activated with known processes. Also typically, the binder is a polymeric or oligomeric material that is capable of maintaining the particulate minerals and carbon in a porous structure. This allows the fluid treatment composite material to be molded or pressed into any desired shape, e.g., a shape suitable for inclusion into the housing of a filtration device, which provides for fluid inflow and outflow, and which filtration device has one or more chambers for contact of the fluid with the purification material. Such a device forms another embodiment of the invention. In addition to maintaining the minerals and carbon particles immobilized in a unitary block, the polymeric binder also provides desirable physical characteristics to the filter material, e.g., rendering it rigid or flexible, depending upon the type and amount of polymeric binder used.

In another embodiment, the invention relates to a fluid treatment material that contains fluid treatment carbon, metal phosphates, metal oxides, reduced metals, silicates, metal sulfates, metal carbonates, silicates, metal hydroxides, or combinations thereof that is in the form of a porous block as the result of the presence of a binder. Typically, at least a portion of these minerals are in the from of aluminum oxide, iron oxides, titanium oxide, iron metal, silicon dioxide and carbon, trace elements such as manganese oxides, and the minerals have been obtained from natural sources, e.g., mining, or from synthetic sources such as the mixing of chemicals containing aluminum, iron, silicon, manganese, and titanium. The carbon is typically activated with known processes. Also typically, the binder is a polymeric or oligomeric material that is capable of maintaining the particulate minerals and carbon in a block structure. This allows the treatment material to be molded or pressed into any desired shape, e.g., a shape suitable for inclusion into the housing of a filtration device, which provides for fluid inflow and outflow, and which filtration device has one or more chambers for contact of the fluid with the purification material. Such a device forms another embodiment of the invention. In addition to maintaining the mineral and carbon particles immobilized in a unitary block, the polymeric binder also provides desirable physical characteristics to the filter material, e.g., rendering it rigid or flexible, depending upon the type and amount of polymeric binder used.

In another embodiment, the invention relates to a purification material for fluids that is in the form of a sheet or membrane, containing the particulate or fiber minerals including fluid treatment carbon, metal phosphates, metal oxides, reduced metals, silicates, metal sulfates, metal carbonates, silicates, metal hydroxides, or combinations thereof with carbon and immobilized with a binder.

In another embodiment, the invention relates to a purification material for fluids that is in the form of a block, sheet or membrane, containing particulate minerals including fluid treatment carbon, metal phosphates, metal oxides, reduced metals, silicates, metal sulfates, metal carbonates, silicates, metal hydroxides, or combinations thereof with carbon and immobilized with a pressure-technique that uses fluid-swellable materials.

In another embodiment, the invention relates to a purification material for fluids that is in the form of a block, sheet or membrane, containing the particulate minerals including fluid treatment carbon, metal phosphates, metal oxides, reduced metals, silicates, metal sulfates, metal carbonates, silicates, metal hydroxides, or combinations thereof. The materials may be particulate, fiber, wire, or combinations thereof of copper and copper alloys including brass and immobilized with either a thermoplastic binder or with a pressure-technique that uses as example a fluid-swellable material.

In another embodiment, the invention relates to a purification material for fluids that is in the form of a block, sheet or membrane, containing the particulate minerals including fluid treatment carbon, metal phosphates, metal oxides, reduced metals, silicates, metal sulfates, metal carbonates, silicates, metal hydroxides, or combinations thereof. The materials may be particulate, fiber, wire, or combinations thereof of iron and iron alloys including steel and immobilized with either a thermoplastic binder or with a pressure-technique that uses as example a fluid-swellable material.

The invention also relates to methods of filtering fluids, such as water, aqueous solutions, and gases, to convert/ reduce a large proportion of one or more types of chemical species contained therein, by contacting the fluid with the purification material of the invention. In a particular aspect of this embodiment of the invention, this contacting occurs within the device described above, with the unfiltered fluid flowing through an inlet, contacting the purification material in one or more chambers, and the filtered fluid flowing out of the chamber through an outlet.

The purification material of the invention can be used to purify drinking water, to purify water used for recreational purposes, such as in swimming pools, hot tubs, and spas, to purify process water, e.g. water used in cooling towers, to purify aqueous solutions, including but not limited to, fermentation broths and cell culture solutions (e.g., for solution recycling in fermentation or other biotechnology processes) and aqueous fluids used in surgical procedures for recycle or reuse, and to purify gases and mixtures of gases such as breathable air, for example, air used to ventilate hospital or industrial clean rooms, air used in diving equipment, or air that is recycled, e.g., in airplanes or spacecraft, and gases used to sparge, purge or remove volatile or particulate matter from surfaces, containers, or vessels. The purification material of the invention has the additional advantage of making use of readily available mineral materials, including those obtained from natural sources, while still maintaining high purification efficiency.

In a preferred embodiment of the invention the composites of the invention are used to treat fluids prior to treatment with membrane, coagulation, precipitation, flocculation, or ion-exchange fluid treatment techniques or methods.

In yet another embodiment of the invention, the material of the invention, namely minerals and optionally other adsorptive and buffering materials in a binder matrix and formed into a block or sheet, can be used as a medium for converting chemical species used in biotechnology applications such as fermentation processes and cell culture and in semiconductor operations. In this embodiment, biological process fluids, such as nutrient broths, substrate solutions, and the like, are passed through the treatment material of the invention in a manner that allows the fluids to come into contact with the chemical species immobilized therein, and effluent removed from the material and further processed as needed.

BRIEF DESCRIPTION OF THE DRAWINGS

FIG. 1 is a cross-sectional view illustrating a particular embodiment of the invention, namely a water filter housing containing a block filter incorporating, metal phosphates, metal oxides, reduced metals, metal silicates, metal sulfates, metal carbonates, metal hydroxides, or combinations thereof and granulated activated charcoal (GAC) in a binder matrix according to the invention.

FIGS. 2a and 2b are schematic views of a particular embodiment of the invention, namely a filter material containing complex mixtures of fluid treatment carbon, metal phosphates, metal oxides, reduced metals, metal silicates, metal sulfates, metal carbonates, metal hydroxides, or combinations thereof and a binder matrix in the form of a membrane or sheet.

DETAILED DESCRIPTION OF THE INVENTION

As indicated above, one embodiment of the invention includes a composite of loose particulate, fiber or combinations thereof of fluid treatment carbon, metal phosphates, metal oxides, reduced metals, silicates, metal sulfates, metal carbonates, silicates, metal hydroxides, or combinations thereof housed in a porous container that allow fluid passage therethrough.

A more preferred embodiment of the invention relates to a purification material in the form of a block filter containing fluid treatment carbon, metal phosphates, metal oxides, reduced metals, silicates, metal sulfates, metal carbonates, silicates, metal hydroxides, or combinations thereof in a binder, which is typically a polymeric material. In a particular aspect of this embodiment, the invention relates to a block filter that contains a mixture of granulated phosphate minerals, silicates, iron in oxide, hydroxide, or reduced metal form or a combination thereof and granulated activated charcoal (GAC) or bone charcoal or other adsorptive filter media in a binder material, such as a thermoplastic of fluid swellable material, such that the mineral derivatives and GAC and/or bone charcoal are fixed within the binder matrix, and that channeling from flow during water treatment cannot occur.

In another particular aspect of this embodiment, the invention relates to a rigid block filter that contains a mixture of silicate minerals and aluminum oxides, titanium oxides, iron oxides, and granulated activated charcoal (GAC) or bone charcoal or other adsorptive filter media in a binder material, such as a thermoplastic material or fluid swelling material, such that the silicate and aluminum, iron and titanium containing minerals and derivatives and GAC and/ or bone charcoal are fixed within the binder matrix, and that channeling from flow during water treatment cannot occur.

The purification materials of the invention can be produced by extrusion, molding including injection molding, or by compression methods including the use of swellable materials. Fibrillation may also be used to prepare fibrils of the mixture of binder polymer and minerals that can then be formed into a sheet, film, or block. It may be produced in any shape or size and may be rigid or flexible. Pressure techniques which use fluid swelling materials may also be used to prepare the mixture of binder, fluid treatment carbon, metal phosphates, metal oxides, reduced metals, metal silicates, metal sulfates, metal carbonates, metal hydroxides, or combinations thereof that can then be formed into a sheet, film, or block. It may be produced in any shape or size and may be rigid or flexible.

The pore size of the filter block influences flow rates of the fluid through the filter, and is a function of the size of the granular particles incorporated into the filter block. As used herein, the term "block" does not denote any particular geometrical shape, but rather that the material is not a sheet or membrane. Nonlimiting examples of "blocks" as this term is intended to be used include tubes, annular rings, as well as more conventional geometrical solids. Material formed into flexible blocks is particularly suitable for use in pipes or tubes that serve as the fluid filter medium.

One of the desirable features of the purification material of the invention is that it may be formed into any desired shape, and thus provides ease of handling and use. For example, the purification material may be formed into a monolith or block that fits into conventional housings for filtration media or it can be shaped to provide purification as part of a portable or personal filtration system. Alternatively, the material may be formed into several different pieces, through which water flows in series or in parallel. Sheets or membranes of the purification material may also be formed. The rigidity of the purification material, whether in block form or in sheet/membrane form, may be altered through inclusion of flexible polymers in the binder material.

While not wishing to be bound by any theory, it is believed that one of the preferred embodiments purification material of the invention achieves its unusually high efficiency in converting/removing contaminants from fluids partly as the result of the immobilization of the mineral and carbon particles in the binder, and the necessity for fluid flowing through the purification material to follow an extended and tortuous path therethrough, instead of forming channels through the purification material as occurs in loose particulate purification materials. This path ensures that the fluid contacts a larger proportion of the surface area of the iron mineral particles, and it prevents sustained laminar flow of the fluid through the filtration material. This latter effect is believed to help prevent laminae of fluid containing arsenic and other contaminants from avoiding sustained contact with iron-mineral particles in the filter. After the purification material has been in service for a period of time, additional contact time generated by particle occlusion will occur as particulate material accumulates in the pores of the purification material.

Those familiar with the art of fluid filtration will understand that the pore size and physical dimensions of the purification material may be manipulated for different applications and that variations in these variables will alter flow rates, back-pressure, and the level of chemical and microbiological contaminant removal. Likewise those knowledgeable in the art will recognize that variations in the percentages of each component of the purification material will provide some variability in utility. For example, increasing the percentage of carbon in the purification material will result in a material having an increased capacity for chlorine removal, while increasing the percentage of binder will result in a purification material having material and mechanical properties closer to that of the binder material and with reduced chemical reaction capacity.

In one particular embodiment of the invention, the complex mineral mixture is derived from the processing of animal bones (bone charcoal) and the processing of natural materials to generate a GAC material. The bone charcoal, which is a mixture after processing of phosphates, sulfates, carbonates, silicates, reduced metals and the GAC are present in approximately equal amounts, with the percentage of binder material kept to a minimum. However, the mineral mixture used in the invention may be generated or obtained from other natural or synthetic/industrial sources and mixtures of the different derivatives can provide differences in the properties of the purification material. For example, adding calcium carbonate to the filter block can decrease the acid concentration in the effluent water if water is used as the fluid. This can be useful in, e.g. neutralizing acidic water in such a way as to maintain desirable water pH levels therein. The carbonate species in the filter material may be obtained either by inclusion of alkali and alkaline earth salts or metal based salts such as those containing titanium, manganese and iron, inclusion of other carbonate salts and compounds, or by pre-conditioning the purification material by passing reactive carbonate-containing solutions therethrough.

Likewise, as the number of interaction sites in the composites are increased through the use of different particle sizes, distributions, structural forms and orientation of different crystal faces, the reaction and binding of metal ions and compounds, radioactive isotopes, and microorganisms can also be modified. Commonly, exposure to increased temperatures allows conversion between crystalline and amorphous forms. Commonly, exposure to metals in a synthesis procedure allows replacement of some of the metal ions in both crystalline and amorphous forms. In many cases, instable mineral forms slowly convert to more stable forms. Examples include the structural changes that are known to occur in calcium phosphates, iron oxides, aluminum oxides, and manganese oxides.

Those experienced in the art will also understand that many different structural forms including different crystal or amorphous lattices are possible for iron minerals, minerals containing iron-aluminum, oxides of manganese, and for other adsorbent materials used in the invention, and that these variations will yield differences in properties of the resulting purification material, as certain structural structures improve and inhibit interactions with chemicals, microorganisms and other biological species. These differences in properties result from differences in interactions between the chemical ions and compounds, microorganisms and other biological species and the different reactive sites that are associated with the surfaces of the fluid treatment carbon, metal phosphates, metal oxides, reduced metals, metal silicates, metal sulfates, metal carbonates, metal hydroxides, or combinations thereof.

Those experienced in the art will also understand that different chemical and biological reactions can occur when these materials are place in fluids, such as water, which will change the composition. As example, the interaction of iron metal with water and salts can produce iron hydroxides and iron oxides in varying ratios and with iron in different oxidation states.

Furthermore, those experienced in the art will also understand that different mineral processing techniques such as milling, grinding, sieving, and screening can increase the concentration of reduced metals and oxide materials in the material undergoing processing and in some cases the final materials will have varying properties.

In another embodiment of the invention, the purification material is constructed to withstand sterilization. Sterilization processes include thermal processes, such as steam sterilization or other processes wherein the purification material is exposed to elevated temperatures or pressures or both, resistive heating, radiation sterilization wherein the purification material is exposed to elevated radiation levels, including processes using ultraviolet, infrared, microwave, and ionizing radiation, and chemical sterilization, wherein the purification material is exposed to elevated levels of oxidants or reductants or other chemical species, and which is performed with chemicals such as halogens, reactive oxygen species, formaldehyde, surfactants, metals and gases such as ethylene oxide, methyl bromide, beta-propiolactone, and propylene oxide.

Additionally, sterilization may be accomplished with electrochemical methods by direct oxidation or reduction with microbiological components or indirectly through the electrochemical generation of oxidative or reductive chemical species. Combinations of these processes are also used on a routine basis. It should also be understood that sterilization processes may be used on a continuous or sporadic basis while the purification material is in use.

In general, the invention comprises a device and a method for the filtration and purification of a fluid, in particular an aqueous solution or water, to remove organic and inorganic elements and compounds present in the water as particulate material. In particular, the device and method can be used to remove and/or convert chemical and microbiological contaminants, including heavy metals such as arsenic, bacteria, and viruses and components thereof, from water or other fluids or gasses destined for consumption or other use by humans or other animals. The method and device of the invention are particularly useful in these applications where the reduction in concentration of chemical and microbiological contaminants made possible by the invention meets WHO and EPA standards for water purification devices, and also exceeds the effectiveness of other known filtration and purification devices incorporating granulated adsorption media that contain iron, manganese and aluminum containing minerals, such as those obtained fluid treatment carbon, metal phosphates, metal oxides, reduced metals, metal silicates, metal sulfates, metal carbonates, metal hydroxides, or combinations thereof. In a particular embodiment of the invention, the purification material is a porous block formed by granulated or particulate fluid treatment carbon, metal phosphates, metal oxides, reduced metals, silicates, metal sulfates, metal carbonates, silicates, metal hydroxide, or combinations thereof along with other optional adsorptive granular materials, described in more detail below, such as ion-exchange resins, retained within a polymer binder matrix. In the method corresponding to this particular embodiment, the chemical and microbiological contaminants are removed from the water when the water is forced through a porous filter block by water pressure on the influent side, or by a vacuum on the effluent side, of the filter block.

In an embodiment of the invention where the purification material is composed of a mixture fluid treatment carbon, metal phosphates, metal oxides, reduced metals, silicates, metal sulfates, metal carbonates, silicates, metal hydroxides, or combinations thereof, such components can be dispersed in a random manner throughout the filter block. The purification material can also be formed with spatially distinct gradients or separated layers. For example, iron and phosphate containing minerals and fluid treatment carbon may be immobilized in separate layers using a solid binder matrix, for instance, a polymer thermoplastic such as polyethylene or the like or through pressure techniques using fluid swellable materials, so that movement of the mixture particles is precluded and detrimental channeling effects during fluid transport through the block are prevented. If the components reside in separate locations, the fluid flow is sequential through these locations. In a particular example of this embodiment, at least a portion of the fluid treatment carbon, metal phosphates, metal oxides, reduced metals, silicates, metal sulfates, metal carbonates, silicates, metal hydroxides, or combinations thereof are in varying ratios. Examples of suitable material mixtures can be obtained from naturally occurring mixtures such as those designated as Natural Charcoal and sold by Brimac Carbon Services and as calcined bauxite as sold by CE Minerals. The minerals in these mixtures may be ground to a desirable particle size, e.g., 80–325 mesh or smaller. A typical analysis of these materials shows 50% or greater calcium phosphate or aluminum oxide and less than 50% iron oxides, phosphates, and silicates, titanium oxides, or manganese oxides. The inorganic and organic ion and compound binding characteristics of these materials have been reported by producers of these raw materials.

In this embodiment, the complex mineral mixtures containing, metal phosphates, metal oxides, reduced metals, silicates, metal sulfates, metal carbonates, silicates, metal hydroxides, or combinations thereof in varying ratios and the fluid treatment carbon are mixed in approximately equal amounts with the minimal amount of binder material necessary to compose a monolithic purification material. However, the concentrations of the mineral mixture and GAC, and binder are substantially variable, and materials having different concentrations of these materials may be utilized in a similar fashion without the need for any undue experimentation by those of skill in the art.

In general, however, when ion-exchange materials are used as the additional adsorbent material, its concentration in the mixture is generally less than 50% by weight, based upon the weight of the composition before any drying or compacting. Examples of these adsorbents include, but are not limited to, various ion-binding materials, such as synthetic ion exchange resins, zeolites (synthetic or naturally occurring), diatomaceous earth, and metal silicate materials and one or more other phosphate-containing materials, such as minerals of the phosphate or oxide class, in particular, minerals containing copper, zinc, iron, aluminum, manganese, and titanium, described herein.

In particular, mineral compositions containing high concentrations of calcium phosphates, aluminum silicates, iron oxides and/or manganese oxides with lower concentrations of calcium carbonates and calcium sulfates are suitable materials for the invention. These materials may be calcined and processed by a number of methods to yield mixtures of varying compositions.

Minerals containing metal which undergo processing usually leaves the metal in chemical forms such as those found in the hydroxide and oxide classes. As example iron may be found in the form of the reduced metal ($Fe^0$), as a hydroxide/oxide mixture commonly referred to as ferric hydroxide ($Fe(OH)_3$), hydrous ferric oxides, ferrihydrite, ($Fe_2O_3 \cdot H_2O$), lepidocrocite (gamma-FeOOH), goethite (alpha-FeOOH), beta-FeOOH, maghemite (gamma-$Fe_2O_3$), and hematite (alpha-$Fe_2O_3$). Naturally occurring iron silicate mixtures include the green sands which contain the mineral glauconite.

Minerals containing phosphate include those with the apatite crystal structure and monocalcium phosphate, dicalcium phosphate, and octacalcium phosphate. It should be noted that these minerals have varying solubilities. Additionally minerals containing both iron and phosphate are exemplary.

Minerals containing manganese include those in the oxide and hydroxide classes. In most cases the formula $MnO_x$, where x varies between the value one and two. Raw ores known as pyrolusite and psilomelane are common starting sources. As example a metallurgical grade ore contains 48–50% manganese, 4–5% iron, 9–12% silica, less than 1% alumina, and less than 1% phosphorus.

Minerals containing aluminum include those in the oxide and silicate class. Specifically, minerals containing alumina are exemplary examples as are those that are considered zeolites.

Additionally, polymeric materials used for ion-binding including derivatised resins of styrene and divinylbenzene, and methacrylate may be used. The derivatives include functionalized polymers having anion binding sites based on quaternary amines, primary and secondary amines, aminopropyl, diethylaminoethyl, and diethylaminopropyl substituents. Derivatives including cation binding sites include polymers functionalized with sulfonic acid, benzenesulfonic acid, propylsulfonic acid, phosphonic acid, and/or carboxylic acid moieties.

Natural or synthetic zeolites may also be used or included as ion-binding materials, including, e.g., naturally occurring aluminosilicates such as clinoptilolite and calcium silicates such as wollastonite. Suitable binder materials include any polymeric material capable of aggregating the particulate materials together and maintaining this aggregation under the conditions of use. They are generally included in amounts ranging from about 10 wt % to about 99.9 wt %, more particularly from about 15 wt % to about 50 wt %, based upon the total weight of the purification material.

Suitable polymeric materials include both naturally occurring and synthetic polymers, as well as synthetic modifications of naturally occurring polymers. The polymeric binder materials generally include one or more thermoset, thermoplastic, elastomer, or a combination thereof, depending upon the desired mechanical properties of the resulting purification material.

In general, polymers melting between about 50° C. and about 500° C., more particularly, between about 75° C. and about 350° C., even more particularly between about 80° C. and about 200° C., are suitable polymeric binders for the invention. For instance, polyolefins melting in the range from about 85° C. to about 180° C., polyamides melting in the range from about 200° C. to about 300° C., and fluorinated polymers melting in the range from about 300° C. to about 400° C., can be particularly mentioned as suitable. Examples of types of polymers suitable for use as binders in the invention include, but are not limited to, thermoplastics, polyethylene glycols or derivatives thereof, polyvinyl alcohols, polyvinylacetates, and polylactic acids. Suitable thermoplastics include, but are not limited to, nylons and other polyamides, polyethylenes, including LDPE, LLDPE, HDPE, and polyethylene copolymers with other polyolefins, polyvinylchlorides (both plasticized and unplasticized), fluorocarbon resins, such as polytetrafluoroethylene, polystyrenes, polypropylenes, cellulosic resins, such as cellulose acetate butyrates, acrylic resins, such as polyacrylates and polymethylmethacrylates, thermoplastic blends or grafts such as acrylonitrile-butadiene-styrenes or acrylonitrile-styrenes, polycarbonates, polyvinylacetates, ethylene vinyl acetates, polyvinyl alcohols, polyoxymethylene, polyformaldehyde, polyacetals, polyesters, such as polyethylene terephthalate, polyether ether ketone, and phenol-formaldehyde resins, such as resols and novolacs. Those of skill in the art will recognize that other thermoplastic polymers can be used in the invention in an analogous manner.

Suitable thermoset polymers for use as, or inclusion in, the binder used in the invention include, but are not limited to, polyurethanes, silicones, fluorosilicones, phenolic resins, melamine resins, melamine formaldehyde, and urea formaldehyde. Suitable elasomers for use as or inclusion in, the binder used in the invention include but are not limited to natural and/or synthetic rubbers, like styrene-butadiene rubbers, neoprenes, nitrile rubber, butyl rubber, silicones, polyurethanes, alkylated chlorosulfonated polyethylene, polyolefins, chlorosulfonated polyethylenes, perfluoroelastomers, polychloroprene (neoprene), ethylene-propylene-diene terpolymers, chlorinated polyethylene, VITON (fluoroelastomer), and ZALAK® (Dupont-Dow elastomer).

Those of skill in the art will realize that some of the thermoplastics listed above can also be thermosets, depending upon the degree of crosslinking, and that some of each may be elastomers, depending upon their mechanical properties, and that the particular categorization used above is for ease of understanding and should not be regarded as limiting or controlling. Naturally occurring and synthetically modified naturally occurring polymers suitable for use in the invention include, but are not limited to, natural and synthetically modified celluloses, such as cotton, collagens, and organic acids. Biodegradable polymers suitable for use in the invention include, but are not limited to, polyethylene glycols, polylactic acids, polyvinylalcohols, co-polylactideglycolides, and the like.

Material binders may also be chosen from those classes of materials which swell through fluid absorption. These materials include crosslinked polymers such as synthetically produced polyacrylic acids, and polyacrylamides and naturally occuring organic polymers such as celluloses. Minerals and clays which swell with fluid absorption include smectite and montmorillinite clays. Examples include bentonite and derviatives. These swellable materials bind the mineral particulates or fibers through pressure techniques.

In the specific embodiment of a filter material that may be sterilized the mineral mixture and the fluid treatment carbon are present in approximately equal amounts, with the percentage of binder material kept to a minimum. The binder used must be stable to one or more of the temperature, pressure, electrochemical, radiative, and/or chemical conditions presented in the sterilization process, and should be otherwise compatible with the sterilization method. Examples of binders suitable for sterilization methods involving exposure to high temperatures (such as steam sterilization or autoclaving) include cellulose nitrate, polyethersulfone, nylon, polypropylene, polytetrafluoroethylene (teflon), and mixed cellulose esters. Purification materials prepared with these binders can be autoclaved when the binder polymers are prepared according to known standards. Desirably, the purification material is stable to both steam sterilization or autoclaving and chemical sterilization or contact with oxidative or reductive chemical species, as this combination of sterilizing steps is particularly suitable for efficient and effective regeneration of the purification material. Additionally, sterilization and regenerating of devices incorporating the magnesium containing mineral materials may be conducted by passing solutions of salt, acid, and/or caustic solutions through the filter.

In the embodiment of the invention wherein sterilization is at least in part conducted through the electrochemical generation of oxidative or reductive chemical species, the electrical potential necessary to generate said species can be attained by using the purification material itself as one of the electrodes. For example, the purification material, which contains polymeric binder, can be rendered conductive through the inclusion of a sufficiently high level of conductive particles, such as granular activated carbon, carbon black, or metallic particles to render a normally insulative polymeric material conductive. Alternatively, if the desired level of carbon or other particles is not sufficiently high to render an otherwise insulative polymer conductive, an intrinsically conductive polymer may be used as or blended into the binder. Examples of suitable intrinsically conductive polymers include doped polyanilines, polythiophenes, and other known intrinsically conductive polymers. These materials can be incorporated into the binder in sufficient amount to provide a resistance of less than about 1 k$\Omega$, more particularly less than about 300 $\Omega$.

The purification material of the present invention need not be in the form of a block, but may also be formed into a sheet or film. This sheet or film may, in a particular embodiment, be disposed on a woven or nonwoven web of, e.g., a polymer. The polymer used to form the woven or nonwoven web may be any thermoplastic or thermosetting resin typically used to form fabrics. Polyolefins, such as polypropylene and polyethylene are particularly suitable in this regard.

The efficiency of the purification material and the method for using it to reduce microbiological and chemical contaminants and the flow rate of the fluid through the material, are a function of the pore size within the block and the influent fluid pressure. At constant fluid pressure, flow rate is a function of pore size, and the pore size within the block can be regulated by controlling the size of the magnesium mineral and GAC granules. For example, a large granule size provides a less dense, more open purification material which results in a faster flow rate, and small granule size provides a more dense, less open purification material which results in a slower flow rate. A block formed with relatively large magnesium mineral granules will have less surface area and interaction sites than a block formed with smaller granules. Accordingly, the purification material of large granules must be of thicker dimension to achieve equal removal of microbiological contaminants. Because these factors are controllable within the manufacturing process, the purification materials can be customized by altering pore size, block volume, block outer surface area, and geometric shape to meet different application criteria. Average pore size in a particular embodiment is kept to below several microns, and more particularly to below about one micron, to preclude passage of cysts. It should be noted that the pore size described herein does not refer to the pores within the mineral or other adsorbent or absorbent particles themselves, but rather to the pores formed within the purification material when the particles are aggregated together by the binder.

The method of making the material of the invention, in its most general aspect, involves combining the particulate containing minerals (and optional additional particulate adsorbent material(s)) with the binder material under conditions of pressure and temperature that allow at least a portion of the binder to be present in liquid form and that allow for compaction of the particulate, and then solidifying the binder around and/or between the particles. The precise nature of the production process will depend to a certain extent upon the nature of the binder material.

For example, if the binder material is supplied in the form of a liquid solution, suspension, or emulsion (e.g., in a volatile solvent), it may be contacted with the particles by dipping or spraying, and the wet particles compressed in a mold. The mold may be optionally heated to evaporate any necessary solvent. The resulting molded material is then dried to form the purification material of the invention.

If, on the other hand, the binder is a polymer resin, it will typically be mixed in pellet form with the particles of the adsorbent material, and the resulting mixture heated and extruded or molded into the desired shape. Examples of suitable particulate/binder extrusion processes and equipment are disclosed in U.S. Pat. Nos. 5,189,092; 5,249,948; and 5,331,037. Other extrusion equipment and processes may also be used. Moreover, the mixture may be heated and injection molded, without the need for any extrusion. Additionally, the binder, a thermoset, may be generated through a crosslinking process that incorporates initiation by chemical processes, electrochemical processes, irradiation and through physical parameters of temperature and pressure variations.

With reference to the drawings, the invention and a mode of practicing it will now be described with regard to one particular embodiment, which meets the EPA and WHO requirements for drinking water filters. FIG. 1 illustrates a typical specific embodiment of a filtration apparatus containing the purification material of the invention, which incorporates a rigid porous block filter. A removable housing 11 is mated with a cap 12, the cap 12 having an inflow orifice 13 and an outflow orifice 14. A water supply conduit 15 is joined to the inflow orifice 13 to deliver non-treated water into the device, and a water discharge conduit 16 is joined to the outflow orifice 14 to conduct treated water from the device. Water passes into the housing 11. The pressure of the water flow forces it through the porous block filter member 17, which as shown is formed in the shape of hollow cylinder with an axial bore 18. The treated water then passes into the axial bore 18 which connects to the outflow orifice 14. FIG. 1 is provided as a representative illustration of one possible configuration. It is to be understood that other configurations where water is caused to pass through a porous filter block (which may have different geometrical shapes and/or different flow properties) are contemplated to be within the scope of the invention. The block 17 may be formed by any of a number of known methods, such as by extrusion, compression, molding, sintering, material swelling pressure or other techniques.

FIG. 2 shows two embodiments where the purification material of the invention is used in the form of a sheet or film. FIG. 2a shows purification material 1 used in connection with normal flow-through filtration, indicated by arrow 2, which represents the fluid being filtered by passage through the purification material 1, which may be in the form of a sheet or film. FIG. 2b shows purification material 1 used in connection with crossflow filtration. Fluid flowing across the filter is indicated by double-headed arrow 3, while fluid flowing through the purification material 1 is indicated by arrow 2. The cross flow fluid indicated by arrow 3 sweeps across the surface of the purification material 1, decreasing the level of particulate matter deposited thereon.

EXAMPLE 1

A cylindrical filter block 17 of the shape shown in FIG. 1 may be prepared with a material composition of approximately 42.5% bone charcoal obtained from Brimac Carbon Industries, approximately 42.5% GAC obtained from KX Industries, and approximately 15% thermoplastic binder material selected from one or more of the thermoplastics described above. This bone charcoal includes a mineral mixture that contains varying amounts of metal phosphates including iron, metal silicates, metal sulfates including calcium, metal carbonates including calcium, metal hydroxides, or combinations thereof.

The material may then be extruded at a temperature that provides a uniform mixture of bone charcoal, GAC, and thermoplastic binder. The cylindrical or toroidally shaped block 17 is approximately 9.8 inches in length, with an outer diameter of approximately 2.5 inches and an inner diameter (the bore 18) of approximately 1.25 inches. This shape filter fits into a standard water filtration housing used in the home and industrial settings. The filter material has a resistance of about 300 Ω.

EXAMPLE 2

The composite prepared in Example 1 was used to oxidize a water soluble trivalent arsenic species to a water soluble pentavalent arsenic species. The following water parameters were used for testing: arsenic(III) 0.058 mg/L; calcium 40 mg/L; fluoride 1 mg/L; magnesium 12 mg/L; nitrate 2 mg/L; pH=8.5; sulfate 50 mg/L; and phosphorus 0.04 mg/L. This composite converted greater than 90% of trivalent arsenic to pentavalent arsenic. The composite maintained this function for more than 125 gallons of the test water.

EXAMPLE 3

A cylindrical filter block 17 of the shape shown in FIG. 1 may be prepared with a material composition of approximately 42.5% calcined bauxite obtained from CE Minerals, approximately 42.5% GAC obtained from KX Industries, and approximately 15% thermoplastic binder material selected from one or more of the thermoplastics described above. This calcined bauxite includes a mineral mixture that contains varying amounts of, silicates and metal oxides including aluminum, titanium, iron, or mixtures thereof. The material may then be extruded at a temperature that provides a uniform mixture of bone charcoal, GAC, and thermoplastic binder. The cylindrical or toroidally shaped block 17 is approximately 9.8 inches in length, with an outer diameter of approximately 2.5 inches and an inner diameter (the bore 18) of approximately 1.25 inches. This shape filter fits into a standard water filtration housing used in the home and industrial settings. The filter material has a resistance of about 300 Ω.

EXAMPLE 4

The composite prepared in Example 3 was used to oxidize a water soluble trivalent arsenic species to a water soluble pentavalent arsenic species The following water parameters were used for testing: arsenic(III) 0.058 mg/L; calcium 40 mg/L; fluoride 1 mg/L; magnesium 12 mg/L; nitrate 2 mg/L; pH=8.5; sulfate 50 mg/L; and phosphorus 0.04 mg/L. This composite converted greater than 90% of trivalent arsenic to pentavalent arsenic. The composite maintained this function for more than 125 gallons of the test water.

EXAMPLE 5

The composite prepared in Example 1 was used to reduce a water soluble chlorine species such as hypochlorous acid in an oxidized state to a chlorine species in a reduced state (choride). The following water parameters were used for testing: total dissolved solids 280–290 mg/L; total organic carbon 1.1 mg/L, pH=7.8–8.0, and chlorine 2.1 mg/L. This composite reduced greater than 90% of the hypochlorous acid. The composite maintained this function for more than 125 gallons of the test water.

EXAMPLE 6

A cylindrical filter block 17 of the shape shown in FIG. 1 may be prepared with a material composition of approximately 35% bone charcoal obtained from Brimac Carbon Industries, approximately 35% GAC obtained from Water-Link Inc, approximately 27.5% copper alloy obtained from KDF, and approximately 2.5% fluid swellable binder material consisting of polyacrylic acid, a synthetic superabsorbent obtained from Chemdahl.

The composite components were uniformly mixed and housed in a porous container of either polyethylene (Porex). The cylindrical or toroidally shaped block 17 is approximately 9.8 inches in length, with an outer diameter of approximately 2.5 inches and an inner diameter (the bore 18) of approximately 1.25 inches. This shape filter fits into a standard water filtration housing used in the home and industrial settings.

EXAMPLE 7

The composite prepared in Example 6 was used to reduce a water soluble chlorine species such as hypochlorous acid in an oxidized state to a chlorine species in a reduced state (choride). Chlorine levels of approximately 2.0 mg/L were reduced to below the detection limits of standard test strip based assays.

EXAMPLE 8

A cylindrical filter block 17 of the shape shown in FIG. 1 was prepared with a material composition of approximately 35% bone charcoal obtained from Brimac Carbon Industries, approximately 35% GAC obtained from Water-Link Inc, approximately 27.5% food grade reduced metal obtained from OM Group Inc., and approximately 2.5% fluid swellable binder material consisting of polyacrylic acid, a synthetic superabsorbent obtained from Chemdahl. The composite contained varying amounts of iron hydroxides.

The composite components are uniformly mixed and housed in a porous container of either polyethylene (Porex). The cylindrical or toroidally shaped block 17 is approximately 9.8 inches in length, with an outer diameter of approximately 2.5 inches and an inner diameter (the bore 18) of approximately 1.25 inches. This shape filter fits into a standard water filtration housing used in the home and industrial settings.

EXAMPLE 9

The composite prepared in Example 8 was used to reduce a water soluble chlorine species such as hypochlorous acid in an oxidized state to a chlorine species in a reduced state (choride). Chlorine levels of approximately 2.0 mg/L were reduced to below the detection limits of standard test strip based assays.

As described above, the material of the invention is extremely useful in the area of water purification, particularly the area of drinking water purification. Because of the extremely high efficiency with which the material of the present invention reacts with components present in water it meets many of the EPA, WHO, and National Sanitation Foundation (NSF) guidelines for materials used as water treatment devices. In addition to functioning as a purifier for drinking water, the material of the invention can also be used to purify water used for recreational purposes, such as water used in swimming pools, hot tubs, and spas.

As the result of the ability of the material of the invention to efficiently react with chemical species such as trivalent arsenic and chlorine in aqueous solutions, it has numerous applications in the pharmaceutical and medical fields. For example, the material of the invention can be used in the preparation of pharmaceuticals and to purify fluids that contact physiological fluids such as blood.

The material can also be used in industrial fields where the manufacture of electronic and semiconductor components are conducted and in the treatment of fluids that result from mining activities.

The material of the invention has multiple uses as a component in water treatment system. As example, it is well known that trivalent arsenic species are not removed efficiently with standard coagulation/filtration techniques, reverse osmosis membrane technology, or ion exchange technology. Use of the invention to convert the reduced arsenic species to an oxidized arsenic species that is more efficiently removed by coagulation/filtration, reverse osmosis and ion exchange technology provides significant enhancement in capability to these treatment strategies.

The material of the invention has numerous other industrial uses, e.g., filtering water used in cooling systems. Cooling water often passes through towers, ponds, or other process equipment where heavy metals are leached into the fluid stream as a result of metal component contact with the fluid. By converting and removing heavy metals, the present invention helps to reduce the health hazard associated with the cooling fluids and the cost and dangers associated with chemical treatment programs, a reduces the cost of waste disposal or liquid discharges.

In each of these applications, the method of using the material of the invention is relatively simple and should be apparent to those of skill in the filtration art. The fluid or gas to be filtered is simply conducted to one side of a block or sheet of material of the invention, typically disposed in some form of housing, and forced through the material as the result of a pressure drop across the purification material. Purified, filtered fluid or gas is then conducted away from the "clean" side of the filter and further processed or used.

The invention having been thus described by reference to certain of its specific embodiments, it will be apparent to those of skill in the art that many variations and modifications of these embodiments may be made within the spirit of the invention, which are intended to come within the scope of the appended claims and equivalents thereto.

What is claimed is:

1. A reactive composite material for fluid treatment comprising a mixture of, fluid treatment carbon metal phosphates, metal oxides, reduced metals, metal silicates, metal sulfates, metal carbonates, metal hydroxides, or a combination thereof, and a binder for binding the mixture; and
    wherein the composite material is capable of oxidizing or reducing a chemical form into a second chemical form wherein the second chemical form may be removed from the fluid and wherein the binder and mixture are housed in a porous support.

2. The composite material of claim 1, wherein the binder and mixture are in the form of a porous block.

3. The composite material of claim 2, wherein the porous block is rigid.

4. The composite material of claim 1, wherein the binder and mixture are in the form of a porous sheet.

5. The composite material of claim 4, wherein the porous sheet is rigid.

6. The composite material of claim 4, wherein the porous sheet is flexible.

7. The composite material of claim 1, wherein at least a portion of said composite materials are in a form selected from particles, fibers, or a combination thereof.

8. The composite material of claim 1, wherein at least a portion of the fluid treatment carbon is activated.

9. The composite material of claim 1, wherein at least a portion of the metal phosphates comprises calcium phosphates.

10. The composite material of claim 9, wherein at least a portion of the calcium phosphates comprises apatite.

11. The composite material of claim 9, wherein at least a portion of the calcium phosphates are selected from calcium monophosphates, diphosphates, tricalicum phosphates, octaphosphate, metaphosphates, or combinations thereof.

12. The composite material of claim 9, wherein the calcium phosphate comprises apatite and iron phosphates.

13. The composite material of claim 1, wherein at least a portion of the metal phosphate is present in a form selected from iron, manganese, aluminum, magnesium, copper or mixtures thereof.

14. The composite material of claim 1, wherein at least a portion of the metal oxides comprises aluminum oxides.

15. The composite material of claim 14, wherein at least a portion of the aluminum oxides comprises alumina.

16. The composite material of claim 1, wherein at least a portion of the metal oxide comprises iron oxide.

17. The composite material of claim 16, wherein at least a portion of the iron oxide is present in a form selected from amorphous hydrous ferric oxide, maghemite, hematite, goethite, lepidocrocite or mixtures thereof.

18. The composite material of claim 1, wherein at least a portion of the metal oxides comprises manganese oxides.

19. The composite material of claim 18, wherein at least a portion of the magnesium oxide is obtained from pyrolusite.

20. The composite material of claim 18, wherein at least a portion of the magnesium oxide is derived from reaction of a permanganate solution with the composite material.

21. The composite material of claim 1, wherein at least a portion of the metal oxides comprises titanium oxide.

22. The composite material of claim 1, wherein at least a portion of the metal oxides comprises silicon oxide.

23. The composite material of claim 1, wherein at least a portion of the metal oxides comprises copper oxides.

24. The composite material of claim 1, wherein at least a portion of the reduced metals comprises iron.

25. The composite material of claim 1, wherein at least a portion of the reduced metals comprises zinc.

26. The composite material of claim 1, wherein at least a portion of the reduced metals comprises copper.

27. The composite material of claim 1, wherein at least a portion of the reduced metals comprises manganese.

28. The composite material of claim 1, wherein at least a portion of the reduced metals comprises alloys.

29. The composite material of claim 28, wherein at least a portion of the alloys include copper and zinc alloys.

30. The composite material of claim 28, wherein at least a portion of the alloys include iron and manganese alloys.

31. The composite material of claim 28, wherein at least a portion of the alloys include iron and carbon alloys.

32. The composite material of claim 1, wherein at least a portion of the reduced metals comprises precious metals.

33. The composite material of claim 32, wherein at least a portion of the precious metals are selected from silver, gold, platinum, rhodium or mixtures thereof.

34. The composite material of claim 1, wherein at least a portion of the metal silicates comprises calcium.

35. The composite material of claim 1, wherein at least a portion of the metal silicates comprises aluminum.

36. The composite material of claim 1, wherein at least a portion of the metal silicates comprises iron.

37. The composite material of claim 1, wherein at least a portion of the metal silicates comprises manganese.

38. The composite material of claim 1, wherein at least a portion of the metal sulfates comprises calcium sulfate.

39. The composite material of claim 1, wherein at least a portion of the metal carbonate comprises calcium carbonate.

40. The composite material of claim 1, wherein at least a portion of the metal carbonate is selected from iron, manganese, aluminum, magnesium, copper carbonate or mixtures thereof.

41. The composite material of claim 1, wherein at least a portion of the metal hydroxides comprises aluminum hydroxide.

42. The composite material of claim 1, wherein at least a portion of the metal hydroxides comprises iron hydroxide.

43. The composite material of claim 42, wherein at least a portion of the iron hydroxide is present in a form containing iron in oxidation states selected from iron II, iron III or combinations thereof.

44. The composite material of claim 42, wherein at least a portion of the iron oxide is present in a form selected from amorphous hydrous ferric oxide, maghemite, hematite, goethite, lepidocrocite or mixtures thereof.

45. The composite material of claim 1, wherein the binder is a polymer material.

46. The composite material of claim 45, wherein the binder is a polymer having melting point between about 50° C. and about 500° C.

47. The composite material of claim 45, wherein the polymer is substantially stable under sterilization conditions.

48. The composite material of claim 45, wherein the binder is selected from thermoplastics, polyethylene glycols or a derivative thereof, polyvinyl alcohols, polyvinylacetate, or polylactic acids.

49. The composite material of claim 48, wherein the binder is a thermoplastic and the thermoplastic is selected from nylon, polyethylene, polyvinylchionde, fluorocarbon resins, polystyrene, polypropylene, cellulosic resins, or acrylic resins.

50. The composite material of claim 45, wherein the polymer material comprises a naturally occurring polymer.

51. The composite material of claim 50, wherein the naturally occurring polymer is selected from natural and synthetically modified celluloses, collagens, or organic acids.

52. The composite material of claim 45, wherein the polymer material comprises an electrically conductive polymer.

53. The composite material of claim 45, wherein the polymer material comprises a biodegradable polymer.

54. The composite material of claim 53, wherein the biodegradable polymer is selected from a polyethyleneglycol, a polylactic acid, a polyvinylalcohol, or a co-polylactideglycolide.

55. The composite material of claim 1, wherein the binder is selected from gelling or absorbent polymers.

56. The composite material of claim 55, wherein the binder is selected from superabsorbents.

57. The composite material of claim 56, wherein the binder is selected from polylactic acids, polyacrylamides or combinations thereof.

58. The composite material of claim 55, wherein said superabsorbent comprises a material selected from polyacrylic acids, polyacrylamides, poly-alcohols, polyamines, polyethylene oxides, cellulose, chitins, gelatins, starch, polyvinyl alcohols and polyacrylic acid, polyacrylonitril e, carboxymethyl cellulose, alginic acids, carrageenans isolated from seaweeds, polysaccharides, pectins, xanthans, poly-(diallyldimethylammonium chloride), polyvinylpyridine, poly-vinylbenzyltrimethylammonium salts, polyvinylacetates, and polylactic acids or combinations thereof.

59. The composite material of claim 56, wherein the superabsorbent comprises a material selected from resins obtained by polymerizing acrylic acid or resins obtained by polymerizing acrylamide.

60. The composite material of claim 55, wherein the polymer material is selected from a naturally occurring polymer, cellulose, alginic acids, carrageenans isolated from seaweeds, polysaccharides, pectins, xanthans, starch, or combinations thereof.

61. The composite material of claim 56, wherein the superabsorbent material has an ionically charged surface.

62. The composite material of claim 61, wherein the superabsorbent material has an ionically charged surface ranging from about 1 to about 100% of the material surface.

63. The composite material of claim 55, wherein the naturally occurring polymer is selected from natural and synthetically modified celluloses, collagens, or organicaids.

64. The composite material of claim 56, wherein the superabsorbent material comprises a biodegradable polymer.

65. The composite material of claim 64, wherein the naturally occurring polymer is a biodegradable polymer selected from a polyethyleneglycol, a polylactic acid, a polyvinylalcohol, a co-polylactideglycolide, cellulose, alginic acids, carrageenans isolated from seaweeds, polysaccharides, pectins, xanthans, starch, or combinations thereof.

66. The composite material of claim 1, wherein the binder material comprises a smectic or montmorillinite clay.

67. The composite material of claim 66, wherein the binder material comprises bentonite.

68. The composite material of claim 4, wherein the binder and mixture are in the form of a sheet and are disposed on a woven web.

69. The composite material of claim 4, wherein the binder and mixture are in the form of a sheet and are disposed on a nonwoven web.

70. The composite material of claim 1, wherein the binder is present in an amount ranging from about 0.5 wt % and about 99.9 wt % of the total weight of the purification material.

71. The composite material of claim 1, further comprising a synthetic ion-exchange material.

72. The composite material of claim 1, wherein the composite materials are derived from natural sources.

73. The composite material of claim 1, wherein the composite material includes carbon and wherein the carbon is derived from plant or animal materials.

74. The composite material of claim 73, wherein the carbon is derived from bone.

75. The composite material of claim 1, wherein the wherein the composite material includes phosphates and the phosphates are derived from mineral or animal materials.

76. The composite material of claim 75, wherein the phosphates are derived from bone.

77. The composite material of claim 1, wherein the wherein the composite material includes metal oxides and the metal oxides are derived from bauxite.

78. Th The process of claim 1, wherein the component material contains one or more of the individual components contained in phosphate rock.

79. The composite material of claim 1, wherein the composite material includes fluid treatment carbon and phosphates and the fluid treatment carbon and phosphates are present in the composite material in approximately equal amounts.

80. The composite material of claim 1, wherein the composite material includes fluid treatment carbon and metal oxides and the fluid treatment carbon and metal oxides are present in the composite material in approximately equal amounts.

81. The composite material of claim 1, wherein the composite material includes fluid treatment carbon, phosphates and reduced metals and the fluid treatment carbon, phosphates and reduced metals are present in the composite material in approximately equal amounts.

82. The composite material of claim 1, wherein the composite material includes fluid treatment carbon, aluminum containing minerals and reduced metals and the fluid treatment carbon, aluminum containing minerals and reduced metals are present in the composite material in approximately equal amounts.

83. The composite material of claim 1, wherein the composite material includes phosphates and fluid treatment carbon and the phosphates and fluid treatment carbon are each present in amounts of about 42.5 wt %, and the binder is present in an amount of about 15 wt %, based upon the total weight of the composite material.

84. The composite material of claim 1, wherein the composite material includes metal oxides and fluid treatment carbon and the metal oxides and fluid treatment carbon are each present in amounts of about 42.5 wt %, the binder is present in an amount of about 15 wt %, based upon the total weight of the composite material.

85. The composite material of claim 1, further comprising an additional adsorptive material, wherein the additional adsorptive material comprises an ion-binding material selected from synthetic ion exchange resins, zeolites, or phosphate minerals.

86. The composite material of claim 85, wherein the synthetic ion exchange resins are selected from functionalized styrenes, vinylchlorides, divinyl benzenes, methacrylates, acrylates, or mixtures, copolymers, or blends thereof.

87. The composite material of claim 85, wherein the natural or synthetic zeolites are silicate containing minerals selected from clinoptilolite or glauconate.

88. The composite material of claim 1, wherein the phosphates are selected from members of the phosphate class of minerals.

89. The composite material of claim 1, wherein the silicates are selected from members of the aluminosilicate group of minerals.

90. The composite material of claim 1, further comprising one or more materials that undergo an oxidation or a reduction in the presence of water or aqueous fluid.

91. A device for oxidizing metals from water or aqueous fluid, comprising:
   a housing; and
   a porous block of the composite material of claim 1.

92. The device of claim 91, wherein the housing comprises an inlet, an outlet, and a contacting chamber therebetween, and wherein the porous block is disposed within the contacting chamber, such that fluid flows into the housing from the inlet, passes through the porous block and then flows out of the housing through the outlet.

93. A method for treating a fluid to convert contaminants from one chemical form to another chemical form, comprising:
   causing the fluid to contact the composite material of claim 1 by flow through or over the composite material, thereby obtaining treated fluid.

94. A method for treating a fluid to convert trivalent arsenic to pentavalent arsenic, comprising:
   causing the fluid to contact the composite material of claim 1 by flow through or over the composite material, thereby obtaining treated fluid.

95. A method for treating a fluid to convert trivalent arsenic to pentavalent arsenic and for removing microorganisms comprising:
   causing the fluid to contact the composite material of claim 1 by flow through or over the composite material, thereby obtaining treated fluid.

96. A method for treating a fluid to convert trivalent arsenic to pentavalent arsenic, and reacting with chlorine containing compounds comprising:
   causing the fluid to contact the composite material of claim 1 by flow through or over the composite material, thereby obtaining treated fluid.

97. A method for treating a fluid to convert iron containing compounds between different oxidation states comprising:
   causing the fluid to contact the composite material of claim 1 by flow through or over the composite material, thereby obtaining treated fluid.

98. A method for treating a fluid to convert sulfer containing compounds between different oxidation states comprising:
   causing the fluid to contact the composite material of claim 1 by flow through or over the composite material, thereby obtaining treated fluid.

99. The method of claim 93, wherein said fluid is water.

100. The method of claim 99, wherein the water is potable.

101. The method of claim 93, wherein the fluid is an aqueous solution.

102. The method of claim 101, wherein the aqueous solution is blood.

103. The method of claim 101, wherein the aqueous solution is a fermentation broth.

104. The method of claim 101, wherein the aqueous solution is a recycled stream in a chemical or biological process.

105. The method of claim 101, wherein the aqueous solution is a recycled stream in a biotechnology process.

106. The method of claim 101, wherein the aqueous solution has been used in as surgical procedure.

107. The method of claim 93, wherein the fluid comprises air.

108. The method of claim 93, wherein the fluid comprises a purge gas.

109. The method of claim 108, wherein the purge gas is selected from $O_2$, $CO_2$, $N_2$, or Ar.

110. The method of claim 93, wherein the fluid is an anesthetic gas.

111. The method of claim 110, wherein the anesthetic gas comprises nitrous oxide.

112. The method of claim 93, further comprising the step of regenerating said composite material by sterilization.

113. The method of claim 112, wherein the sterilization comprises exposing the composite material to elevated temperature, pressure, radiation levels, chemical oxidants or reductants, or combinations thereof.

114. The method of claim 113, wherein the sterilization comprises autoclaving.

115. The method of claim 113, wherein the sterilization comprises electrochemical treatment.

116. The method of claim 113, wherein the sterilization comprises a combination of chemical oxidation and autoclaving.

117. The method of claim 93, wherein the fluid is a gaseous mixture.

118. The method of claim 117, wherein the gaseous mixture includes air.

119. The method of claim 117, wherein the gaseous mixture contains oxygen, carbon dioxide, nitrogen, argon, nitrogen oxides or combinations thereof.

120. The method of claim 119, wherein the gaseous mixture is used to pressurize a chamber.

121. The method of claim 120, wherein the gaseous mixture is used to sparge or purge an aqueous solution for the purpose of increasing the concentration of the sparging gas in the solution.

122. The method of claim 120, wherein the gaseous mixture is used to sparge or purge an aqueous solution for the purpose of decreasing the concentration of the gases initially present in the solution.

123. The method of claim 120, wherein the gaseous mixture is used to remove particulate material from surfaces.

124. A medium for reducing unwanted arsenic species, wherein the medium comprises the composition of claim 1 and is in the form of a rigid, porous block or a sheet.

125. A medium for reducing unwanted iron species, wherein the medium comprises the composition of claim 1 and is in the form of a rigid, porous block or a sheet.

126. A medium for reducing unwanted sulfur species, wherein the medium comprises the composition of claim 1 and is in the form of a rigid, porous block or a sheet.

127. A method for regeneration of the composite material of claim 1 comprising:

adding a solution including a regenerating material selected from salt, acid, caustic, oxidizer, or combinations thereof to the composition of claim 1.

128. The method of claim 127, wherein the solution contains chlorine.

129. The method of claim 127, wherein the solution contains a peroxide.

130. The method of claim 127, wherein the solution contains a permanganate.

131. The method of claim 126, wherein the solution contains a carbonate.

* * * * *